United States Patent
Ota et al.

(10) Patent No.: US 7,260,116 B2
(45) Date of Patent: Aug. 21, 2007

(54) BANDWIDTH ALLOCATION METHOD IN POINT-TO-MULTIPOINT COMMUNICATION SYSTEM

(75) Inventors: Noriyuki Ota, Ichikawa (JP); Noriki Miki, Yokohama (JP)

(73) Assignee: Nippon Telegraph and Telephone Corporation, Tokyo (JP)

( * ) Notice: Subject to any disclaimer, the term of this patent is extended or adjusted under 35 U.S.C. 154(b) by 1086 days.

(21) Appl. No.: 10/374,134

(22) Filed: Feb. 25, 2003

(65) Prior Publication Data

US 2003/0165118 A1    Sep. 4, 2003

(30) Foreign Application Priority Data

Mar. 1, 2002    (JP) .............................. 2002-056461

(51) Int. Cl.
   *H04J 3/18*    (2006.01)
(52) U.S. Cl. ...................... 370/477; 370/465; 370/468; 370/470; 370/480; 370/395.21; 370/395.42
(58) Field of Classification Search ...................... None
   See application file for complete search history.

(56) References Cited

U.S. PATENT DOCUMENTS

| | | | |
|---|---|---|---|
| 6,292,651 B1 | 9/2001 | Dapper et al. | |
| 2001/0024239 A1* | 9/2001 | Feder et al. | 348/423.1 |
| 2002/0009080 A1 | 1/2002 | Engstrand et al. | |
| 2002/0013149 A1* | 1/2002 | Threadgill et al. | 455/427 |
| 2002/0118666 A1* | 8/2002 | Stanwood et al. | 370/345 |

FOREIGN PATENT DOCUMENTS

EP    1 172 955    1/2002

OTHER PUBLICATIONS

N. Oota, et al., "Dynamic Bandwidth Allocation Method for Low Latency EPON", Technical Report of IEICE (Institute of Electronics, Information and Communication Engineers), vol. 102, No. 20, NS2002-18, pp. 5-8, Apr. 2002.
N. Oota, et al., "Dynamic Bandwidth Allocation Method for Low Latency EPON", Proceedings of the 2002 IEICE General Conference, B-8-51, p. 421, Mar. 7, 2002.
Summary of Items 1 and 2 above.

* cited by examiner

*Primary Examiner*—Raj K. Jain
(74) *Attorney, Agent, or Firm*—Harness, Dickey & Pierce, P.L.C.

(57) ABSTRACT

A bandwidth allocation method used in a point-to-multipoint communication system, for efficiently using the bandwidth while shortening delay time. A central unit quantizes round-trip propagation delay times of subsidiary units, groups the subsidiary units, assigns the same quantized round-trip delay time to the same group, and allocates allocation request signal bandwidths to the subsidiary units of the same group when receiving allocation requests within a predetermined period. Based on the quantized round-trip delay time, the bandwidths are located as close as possible while the bandwidths do not temporally overlap with each other and as temporally ahead as possible. Data signal bandwidths are also allocated to the subsidiary units of the same group, based on the quantized round-trip delay time and requested amounts of data, in a manner such that the bandwidths are located as temporally ahead as possible but temporally behind in comparison with the allocation request signal bandwidths.

8 Claims, 6 Drawing Sheets

BANDWIDTH ALLOCATION METHOD IN POINT-TO-MULTIPOINT COMMUNICATION SYSTEM

BACKGROUND OF THE INVENTION

1. Field of the Invention

The present invention relates to a bandwidth allocation method used in a point-to-multipoint communication system in which a plurality of subsidiary units are connected to a single central unit via transmission paths and a transmission bandwidth is shared by the subsidiary units so as to send data to the central unit.

2. Description of the Related Art

Generally, in the point-to-multipoint communication system such as a LAN, a CATV network, a satellite communication network, or a subscriber access optical network, a central unit intercommunicates with a plurality of subsidiary units via a common communication path used in a coaxial communication, wireless communication, or optical fiber communication system.

The PON transmission system is an example of the point-to-multipoint communication system, in which a central unit and subsidiary units are connected via optical fibers and an optical branch section.

Figure 2:
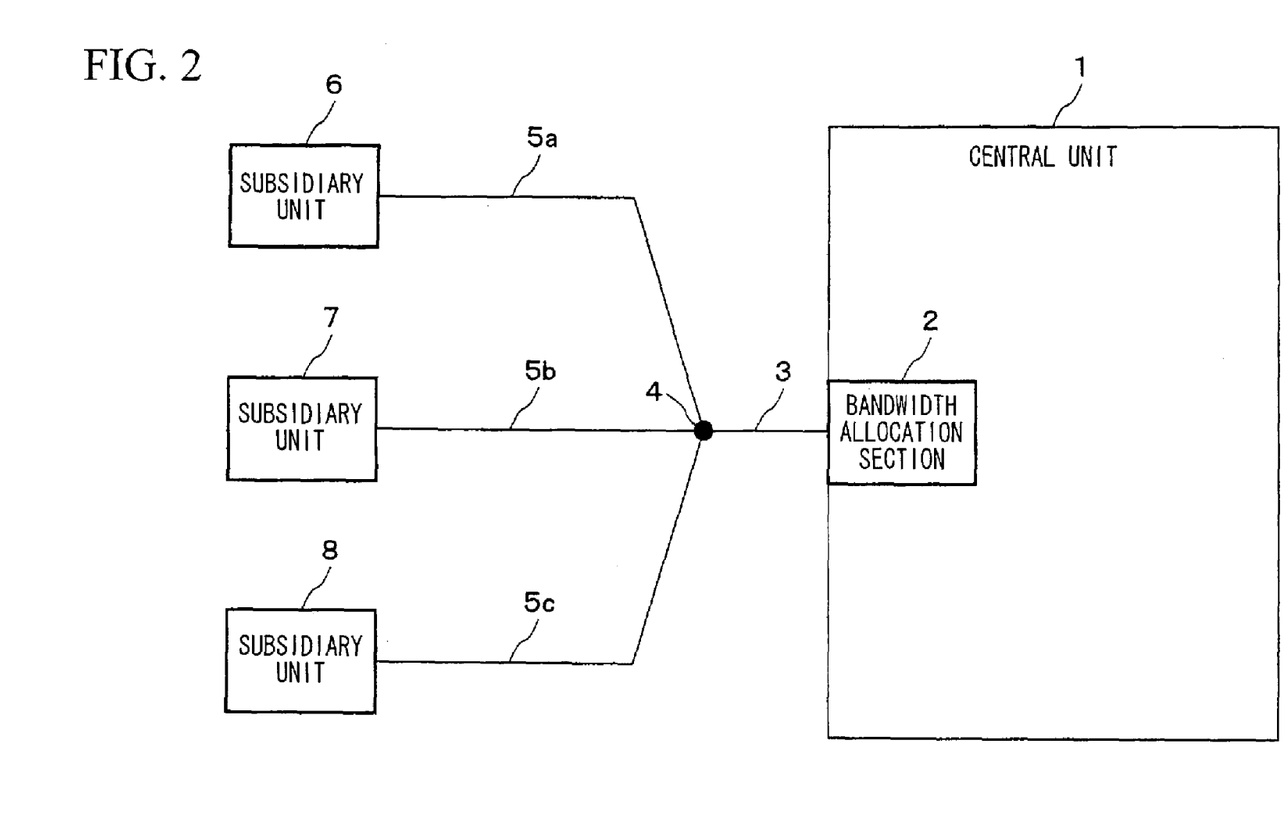
FIG. 2 is a block diagram showing the general structure of the point-to-multipoint communication system.

FIG. 2 is a block diagram showing a topology for the PON transmission system. The transmission path (i.e., optical fiber) 3 connected to the bandwidth allocating section 2 in a single central unit 1 is combined with branch optical fibers 5a, 5b, and 5c at the optical branch point 4, which are respectively connected to subsidiary units 6, 7, and 8. A transmission bandwidth (for transmitting data to the central unit 1) is allocated to each of the subsidiary units 6, 7, and 8 by the bandwidth allocating section 2.

In order to smoothly perform communication between the central unit 1 and the subsidiary units 6, 7, and 8 via the common transmission path 3, an access method for allocating the usage of the transmission path 3 to the subsidiary units 6, 7, and 8 is very important, and various kinds of the access method are known.

For example, each subsidiary unit issues a request for bandwidth allocation to the central unit within a predetermined period of time, and the central unit calculates a bandwidth (for transmitting data to the central unit) to be allocated to the subsidiary unit based on the amount of bandwidth requested by the subsidiary unit. The central unit then informs the subsidiary unit of permission for the transmission. Here, the central unit allocates bandwidths for an allocation request signal and a data signal to each subsidiary unit.

More specifically, in the first conventional method, the central unit allocates bandwidths for the allocation request signals from all subsidiary units in a specific period of time, in a manner such that the bandwidths do not overlap (or collide) with each other. According to this method, the central unit can allocate bandwidths to all subsidiary units fairly based on the allocation requests from the subsidiary units or can efficiently allocate bandwidths to all subsidiary units based on the predetermined conditions. The allocation of bandwidths for the allocation request signals is performed at regular intervals, and the remaining bandwidths are allocated for the data signals.

Figure 3:
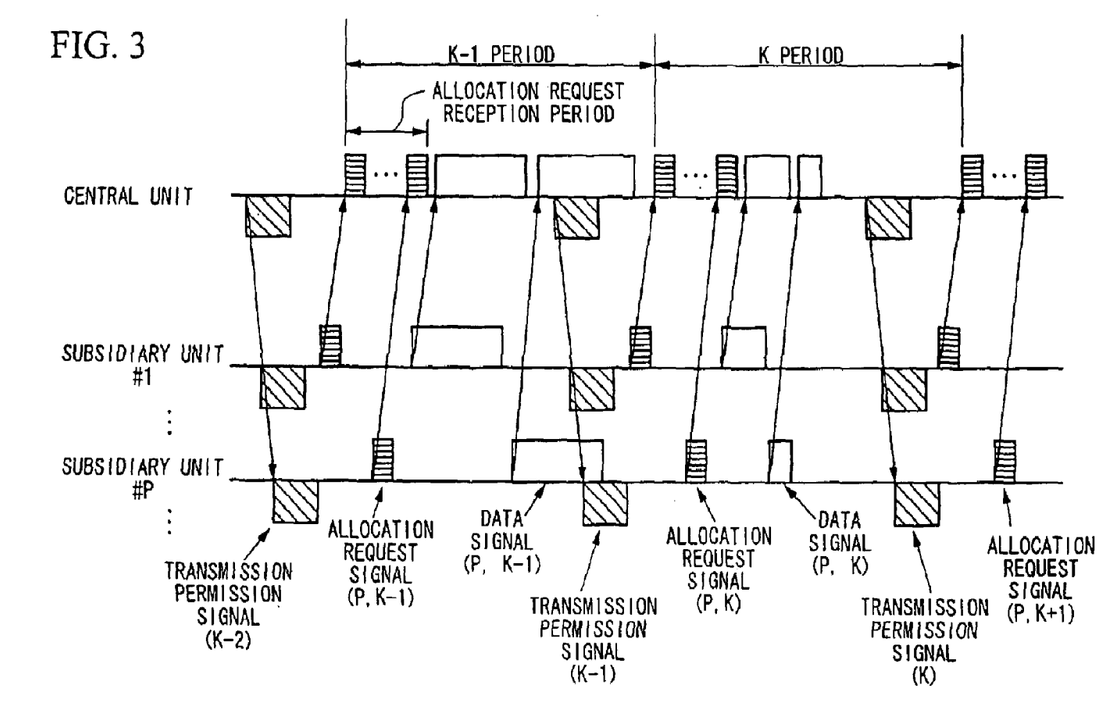
FIG. 3 is a timing diagram for explaining the first conventional bandwidth allocation method.

FIG. 3 is a diagram showing the allocation process in the first conventional method. As shown in the figure, the central unit sends a transmission permission signal (for permitting data to the central unit) to each subsidiary unit at regular intervals. According to the transmission permission signal, each subsidiary unit sends an allocation request signal to the central unit in a manner such that the sent signal reaches the central unit within the specific allocation request reception period of time.

In the transmission permission signal, the transmission start time for each signal (sent from the subsidiary unit) and the amount of the data signal (i.e., permitted amount of data) are stored, so that the allocation request signals do not overlap (or collide) with each other and the data signals of the subsidiary units also do not overlap with each other. According to such a transmission permission signal, each subsidiary unit sends the allocation request signal and the data signal.

That is, based on the allocation request signals (1, K−1), . . . , (P, K−1), received from the subsidiary units in the K−1 period (i.e., (K−1)th period), the central unit calculates allocated bandwidths in the K period (i.e., K−th period) and informs each subsidiary unit of the transmission start time for each of the allocation request signal and the data signal, and the amount of data signal.

In this process, the amounts of bandwidth to be allocated, which are requested by all subsidiary units, can be communicated to the central unit; thus, the central unit can calculate optimum bandwidths to be allocated in the next period. For example, the subsidiary unit #P (see FIG. 3) sends the allocation request signal (P, K) and the data signal (P, K) in turn in the K period, according to the transmission start times and the amount of data included in the communicated transmission permission signal (K−1).

The above-explained steps are repeated, so that the transmission bandwidth for sending data to the central unit can be dynamically allocated.

On the other hand, in the second conventional method, every time the central unit receives an allocation request from any subsidiary unit, the subsidiary unit calculates bandwidths allocated to the subsidiary unit, not in consideration of the other subsidiary units, so that bandwidths for the allocation request signal and the data signal are selected among bandwidths which have not yet been allocated. According to this method, the bandwidth allocation for the relevant subsidiary unit can be performed without awaiting allocation requests from the other subsidiary units.

Figure 4:
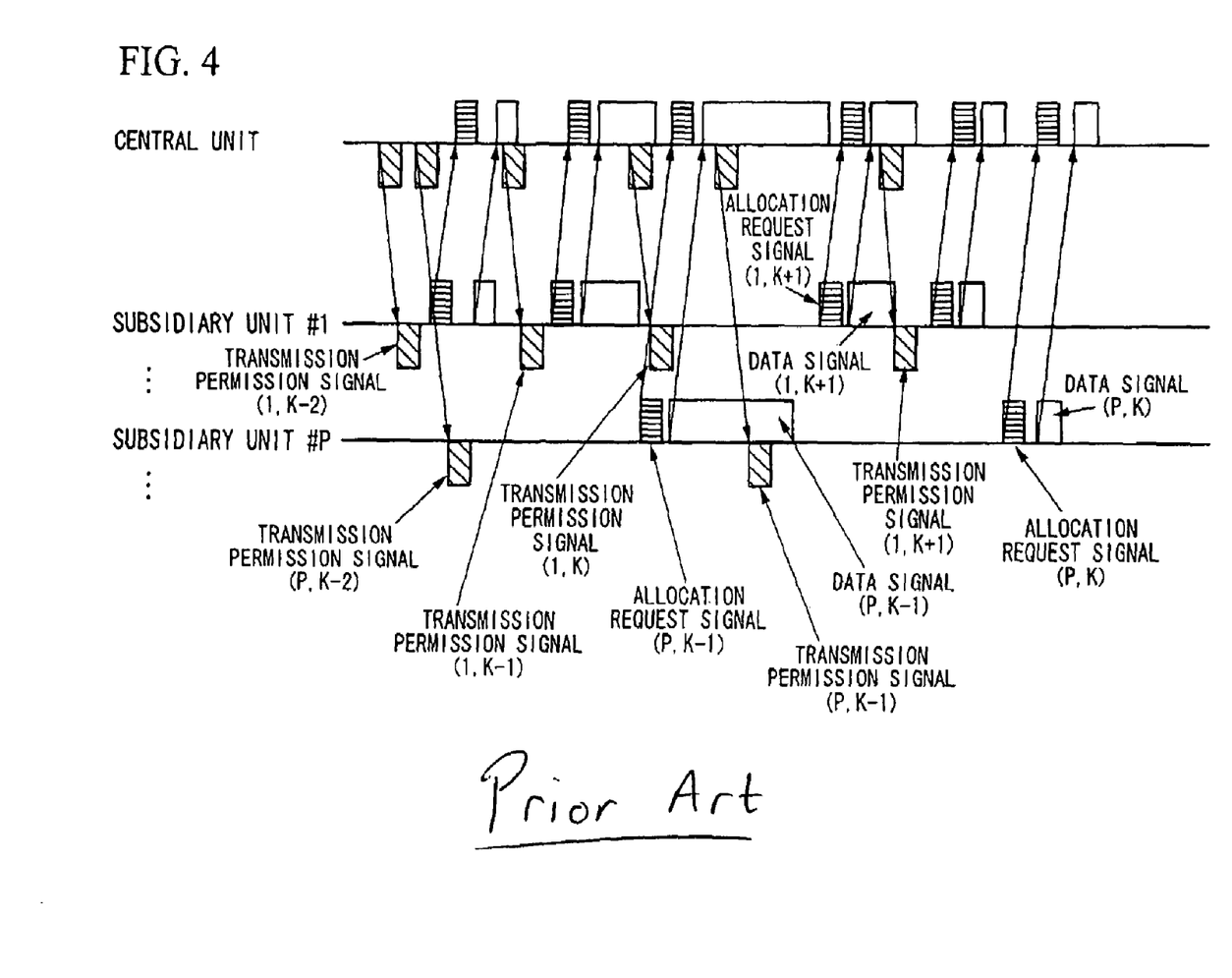
FIG. 4 is a timing diagram for explaining the second conventional bandwidth allocation method.

FIG. 4 is a diagram showing the allocation process in the second conventional method. In this method, no specific period is defined, and the central unit 1 sends the transmission permission signals to the subsidiary units #1, . . . , #P, . . . According to the transmission permission signals, each subsidiary unit sends the allocation request signal and the data signal to the central unit 1. Every time the central unit 1 receives the allocation request signal from any subsidiary unit, the central unit 1 allocates optimum bandwidths for the allocation request signal and the data signal to be sent from the subsidiary unit, where the allocated bandwidths are selected among bandwidths which have not yet been allocated.

That is, based on the allocation request signal (P, K−1) from the subsidiary unit #P, the central unit I calculates bandwidths to be allocated next for the subsidiary unit #P and sends the transmission permission signal (P, K−1) so as to communicate the transmission start time for each of the allocation request signal and the data signal, and the amount of the data signal.

In this process, the central unit independently performs the bandwidth allocation for each subsidiary unit; thus, it is possible to quickly allocate the next bandwidth independent of the subsidiary units which have long round-trip propagation delay times, thereby reducing the delay time for starting the data transmission. For example, the subsidiary unit #P sends the allocation request signal (P, K) and the data signal (P, K) according to the transmission start time for each signal and the amount of data, which are communicated using the transmission permission signal (P, K−1). In parallel to this operation of the subsidiary unit #P, bandwidth allocation for another subsidiary unit is performed independent of the allocation for the subsidiary unit #P.

The above-explained steps are repeatedly performed, so that the transmission bandwidth for sending data to the central unit can be dynamically allocated.

In the above-explained conventional methods, it is impossible to efficiently use the transmission bandwidth while reducing the delay time for starting the transmission of the data signal (stored in the subsidiary unit) to the central unit.

Figure 5:
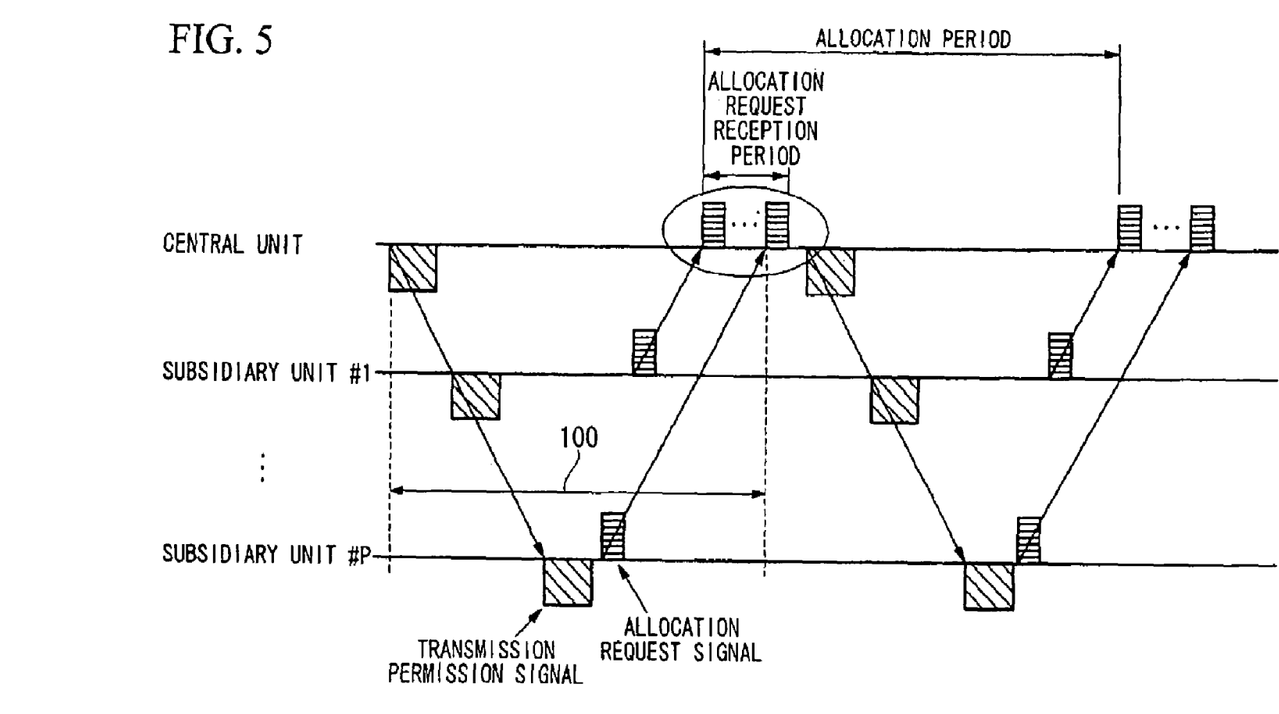
FIG. 5 is a timing diagram for explaining inefficient bandwidth allocation in the first conventional bandwidth allocation method.

In the first conventional method, the delay time can be reduced by shortening the period for bandwidth allocation. However, as shown in FIG. 5, it is necessary to receive the allocation request signals from all subsidiary units in a specific period of time; thus, the bandwidth allocation period cannot be shortened to be less than the maximum round-trip propagation delay time (refer to the length of the double-headed arrow indicated by reference numeral 100).

Figure 6:
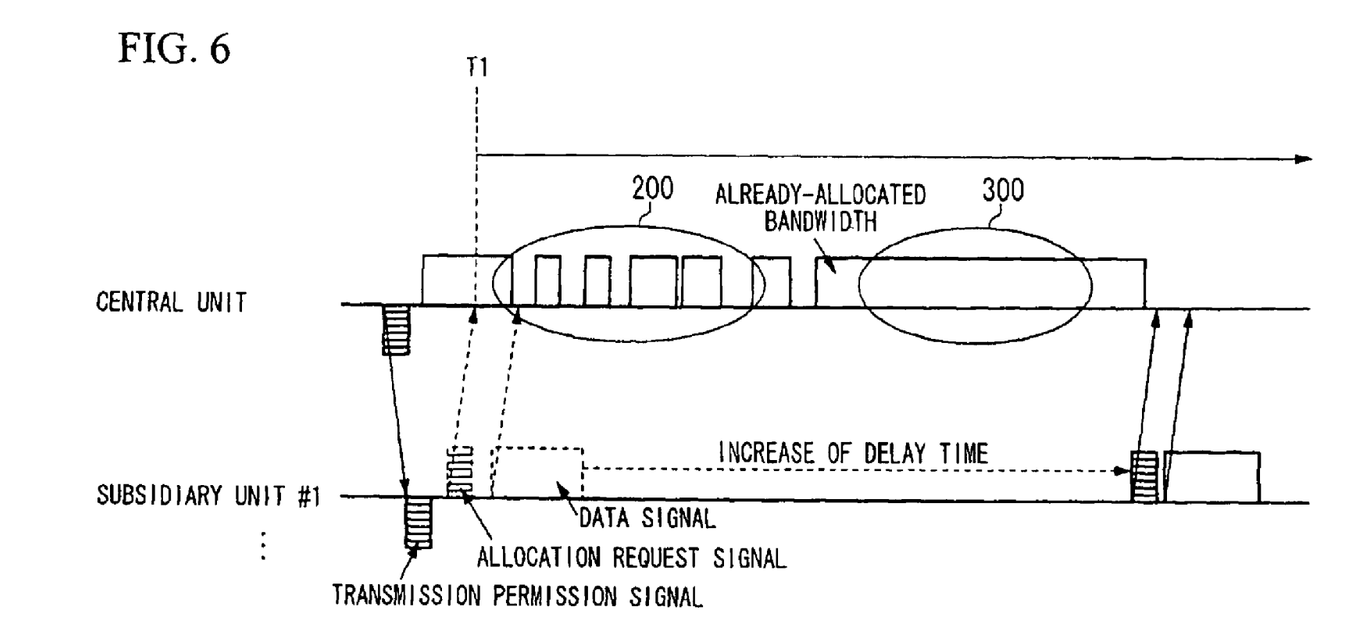
FIG. 6 is a timing diagram for explaining inefficient bandwidth allocation in the second conventional bandwidth allocation method.

In the second conventional method, the bandwidth allocation period for a subsidiary unit can be shortened to the round-trip propagation delay time of the subsidiary unit, independent of the round-trip propagation delay times of the other round-trip propagation delay times. However, the bandwidth is independently allocated to each subsidiary unit without referring to the amount of bandwidths to be allocated, which are requested by other subsidiary unit; therefore, the delay time may be increased as shown in FIG. 6. In the example shown in FIG. 6, bandwidth allocation is possible from time T1 according to the round-trip propagation delay time of the subsidiary unit #1. However, owing to a section where bandwidths, which have not yet been allocated, are dispersed and thus the bandwidth allocation should be inefficiently performed (refer to the section indicated by reference numeral 200), or a section where a long bandwidth has already been allocated to a subsidiary unit and thus the delay time for starting the signal transmission of another subsidiary unit is increased (refer to the section indicated by reference numeral 300), the bandwidth cannot be efficiently used while reducing the delay time.

SUMMARY OF THE INVENTION

In consideration of the above circumstances, an object of the present invention is to provide a bandwidth allocation method used in a point-to-multipoint communication system in which a plurality of subsidiary units are connected via a transmission path to a single central unit, wherein the bandwidth can be efficiently used while shortening the delay time.

Therefore, the present invention provides a bandwidth allocation method used in a point-to-multipoint communication system in which a plurality of subsidiary units are connected via a transmission path to a single central unit and a transmission bandwidth for sending data from the subsidiary units to the central unit is allocated by the central unit to the subsidiary units based on allocation requests from the subsidiary units, where bandwidths for a data signal and an allocation request signal are allocated to each subsidiary unit, the method performed by the central unit comprising the steps of:

quantizing round-trip propagation delay times L between the central unit and the respective subsidiary units by using a division number N, N being an integer of 2 or greater, so as to group the subsidiary units, and assigning a quantized round-trip delay time Lq, which functions as the round-trip propagation delay time, to the subsidiary units which belong to the same group;

allocating bandwidths for allocation request signals to the subsidiary units every time the central unit receives allocation requests from said subsidiary units within a predetermined period of time, wherein based on the quantized round-trip delay time Lq, the bandwidths for the allocation request signals allocated to the subsidiary units which belong to the same group are located as close as possible in a manner such that the bandwidths do not temporally overlap with each other and as temporally ahead as possible in bandwidths which have not yet been allocated; and allocating bandwidths for data signals to the subsidiary units which belong to the same group, based on the quantized round-trip delay time Lq and requested amounts of data which are included in the allocation requests from the subsidiary units, in a manner such that the bandwidths for the data signals are located in bandwidths which have not yet been allocated, as temporally ahead as possible but temporally behind in comparison with the bandwidths for the allocation request signals allocated to the group.

As a preferable example, the subsidiary units are grouped into s+2 groups, s being an integer which satisfies $0 \leq s \leq N-2$, under conditions that:

$$0 < L \leq a_0 d,\ a_0 d < L \leq a_1 d,\ a_1 d < L \leq a_2 d,\ \ldots,\ a_s d < L \leq Lmax$$

where:

grouping coefficient $a_i$, i being an integer of 0 or greater, is an integer of 1 or greater, which satisfies $a_i < a_{i+1}$;

Lmax is the maximum round-trip propagation delay time; and d=Lmax/N; and the quantized round-trip delay time Lq(j) for the subsidiary units which belong to the j-th group is set to a value selected from the range from $a_j d$ to Lmax, where j=0, 1, ..., s+1.

As a typical example, the grouping coefficient $a_i$ satisfies $a_i = 2^i$.

As another typical example, the division number N is a power of 2.

The central unit may determine the division number N according to the round-trip propagation delay time L of each subsidiary unit which issues the allocation request.

In addition, the grouping may be performed and the quantized round-trip delay time Lq may be updated every time the division number N is changed.

Typically, the bandwidth allocation method further comprises the steps of:

allocating bandwidths for next allocation request signals to the subsidiary units every time the subsidiary units, which belong to the same group and have been allocated with the bandwidths for the allocation request signals, issue allocation requests again, wherein based on the quantized round-trip delay time Lq, the bandwidths for the next allocation request signals are located as close as possible in a manner such that the bandwidths do not temporally overlap with each other and as temporally ahead as possible in bandwidths which have not yet been allocated; and allocating bandwidths for next data signals to said subsidiary units which issue the allocation requests again, based on the quantized round-trip delay time Lq and requested amounts of data which are included in the current allocation requests, in a manner such that the bandwidths for the next data signals are located in bandwidths which have not yet been allocated, as temporally ahead as possible but temporally behind in comparison with the bandwidths for the next allocation request signals allocated to the group.

The present invention also provides a program for making a computer execute a bandwidth allocation process performed in a point-to-multipoint communication system in which a plurality of subsidiary units are connected via a transmission path to a single central unit and a transmission bandwidth for sending data from the subsidiary units to the central unit is allocated by the central unit to the subsidiary units based on allocation requests from the subsidiary units, where bandwidths for a data signal and an allocation request signal are allocated to each subsidiary unit, the process comprising the steps of:

quantizing round-trip propagation delay times L between the central unit and the respective subsidiary units by using a division number N, N being an integer of 2 or greater, so as to group the subsidiary units, and assigning a quantized round-trip delay time Lq, which functions as the round-trip propagation delay time, to the subsidiary units which belong to the same group;

allocating bandwidths for allocation request signals to the subsidiary units every time the central unit receives allocation requests from said subsidiary units within a predetermined period of time, wherein based on the quantized round-trip delay time Lq, the bandwidths for the allocation request signals allocated to the subsidiary units which belong to the same group are located as close as possible in a manner such that the bandwidths do not temporally overlap with each other and as temporally ahead as possible in bandwidths which have not yet been allocated; and allocating bandwidths for data signals to the subsidiary units which belong to the same group, based on the quantized round-trip delay time Lq and requested amounts of data which are included in the allocation requests from the subsidiary units, in a manner such that the bandwidths for the data signals are located in bandwidths which have not yet been allocated, as temporally ahead as possible but temporally behind in comparison with the bandwidths for the allocation request signals allocated to the group.

According to the bandwidth allocation method (and the related program) of the present invention, the subsidiary units are grouped based on the round-trip propagation delay time L and a set of bandwidths for the allocation request signals are collectively allocated to each subsidiary unit group; therefore, every time the central unit receives allocation request signals (which are collectively issued from each group), the central unit can calculate the next bandwidths to be allocated to the relevant group. Therefore, the transmission bandwidth for transmitting data to the central unit can be efficiently used while shortening the delay time for starting the data transmission.

DESCRIPTION OF THE PREFERRED EMBODIMENTS

Hereinafter, a point-to-multipoint communication system, to which an embodiment of the bandwidth allocation method according to the present invention is applied, will be explained with reference to the drawings. The block diagram for showing the structure of the present communication system is basically the same as the conventional structure shown in FIG. 2; however, the function and operation of the bandwidth allocating section 2 is different.

Figure 1:
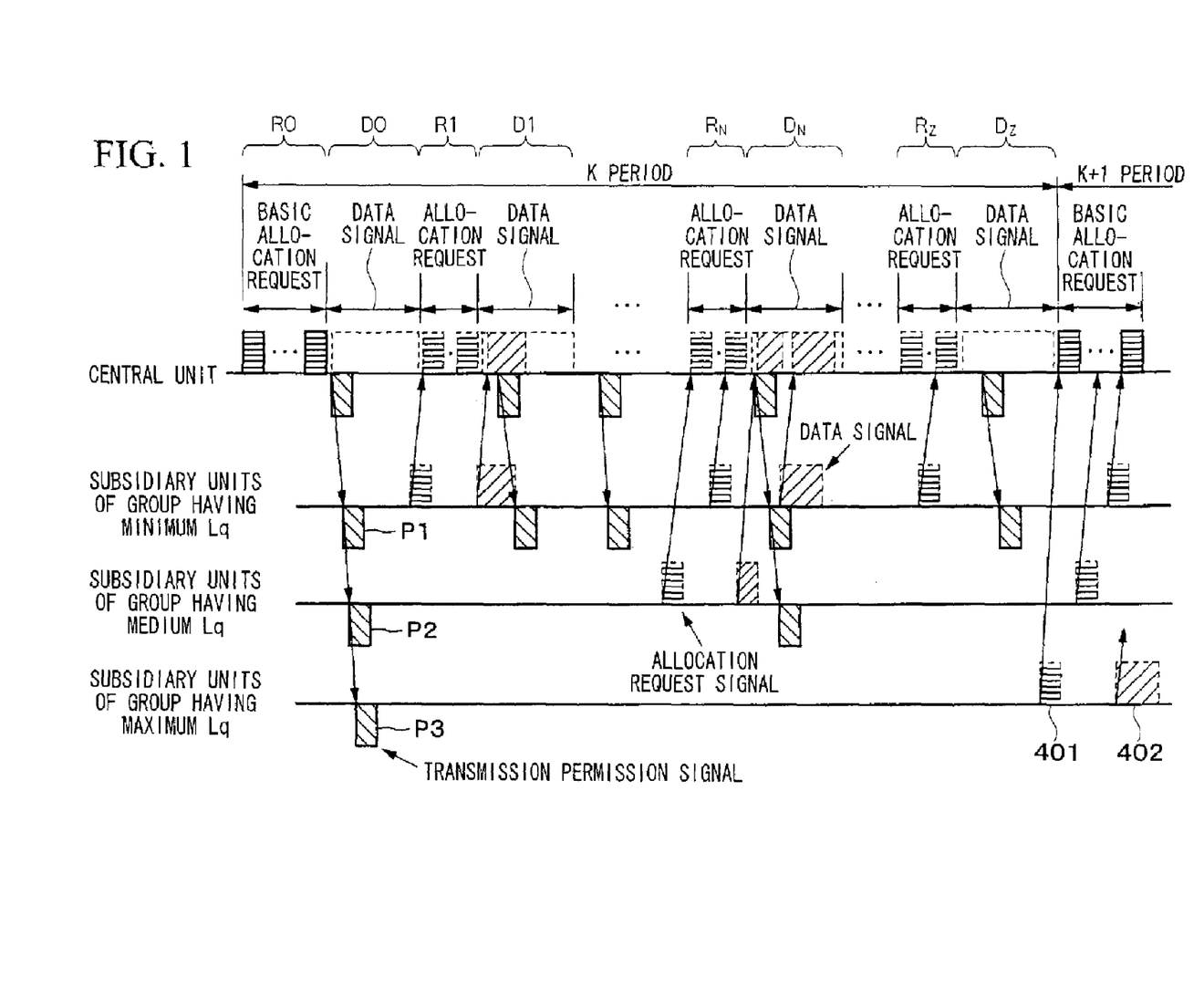
FIG. 1 is a timing diagram for explaining the bandwidth allocation method used in the point-to-multipoint communication system, as an embodiment according to the present invention.

Below, the function and operation of the bandwidth allocating section 2 will be explained with reference to FIG. 1. In FIG. 1, "BASIC ALLOCATION REQUEST" appended to some double-headed arrows indicates a basic allocation request signal bandwidth, "DATA SIGNAL" appended to some double-headed arrows indicates a data signal bandwidth, and "ALLOCATION REQUEST" appended to some double-headed arrows indicates an allocation request signal bandwidth, where these bandwidths will be explained below in detail.

First, similarly to the first conventional method, a specific allocation period is defined as a basic period. This basic period is set to the maximum round-trip propagation delay time "Lmax", that is, minimized as much as possible. Here, the maximum round-trip propagation delay time is the longest time among the round-trip propagation delay times between the central unit and the respective central units (refer to FIG. 5). In addition, bandwidths for the allocation request signals from all subsidiary units are allocated in a manner such that the bandwidths are located as close as possible while the bandwidths do not overlap with each other and that the allocation request signals can be received at the head of each basic period of time (see reference symbol R0 in FIG. 1).

Next, the subsidiary units are grouped according to the round-trip propagation delay time L of each subsidiary unit. Here, the round-trip propagation delay time L of each subsidiary unit is quantized and the grouping is performed based on the quantization, and the same quantized round-trip delay time Lq is assigned to the subsidiary units which belong to the same group.

In a specific example of grouping, the subsidiary units are grouped into s+2 groups (s is any integer which satisfies $0 \leq s \leq N-2$) under conditions that:

$$0 < L \leq a_0 d,\ a_0 d < L \leq a_1 d,\ a_1 d < L \leq a_2 d, \ldots, \\ a_s d < L \leq Lmax \quad (1)$$

where:

grouping coefficient $a_i$ (i is an integer of 0 or greater) is an integer of 1 or greater, which satisfies $a_i < a_{i+1}$;

Lmax is the maximum round-trip propagation delay time; and d=Lmax/N.

In addition, the quantized round-trip delay time Lq(j)=0, 1, ..., s+1) for the subsidiary units which belong to the j-th group is set to any value selected from the range from aid to Lmax (typically, $a_j d$).

For example, the grouping coefficient $a_i$ is defined so as to satisfy $a_i = 2^i$, and the division number N is a power of 2.

Based on the allocation request signals received in a predetermined period of time from the subsidiary units (refer to reference symbol R0 in FIG. 1), the bandwidth allocating section 2 allocates bandwidths for the allocation request signal and the data signal to each relevant subsidiary unit (refer to reference symbols R1 and $R_N$ and the reference symbols D1 and $D_N$).

Regarding the subsidiary units belonging to the same group (i.e., having the same quantized round-trip delay time Lq), the bandwidths for the allocation request signals are located as close as possible while the bandwidths do not overlap with each other, and also as temporally ahead as possible (refer to reference symbol R1). On the other hand, the bandwidths for the data signals are also located as temporally ahead as possible but temporally behind in comparison with the bandwidths for the allocation request signals allocated to the group (refer to reference symbol D1).

Here, the first conventional method, in which the allocation is performed in consideration of all subsidiary units, is applied to the bandwidth allocation among the subsidiary units belonging to the same group. That is, based on the allocation requests issued from subsidiary units belonging to the same group in a specific period of time (e.g., R0), the subsidiary units which belong to the same group are allocated with (i) next bandwidths for the allocation request signals (i.e., the bandwidths which are located in R1 and respectively allocated to the relevant subsidiary units) and (ii) next bandwidths for the data signals (i.e., the bandwidths which are located in D1 and respectively allocated to the relevant subsidiary units).

According to such allocation, as shown in FIG. 1, the subsidiary units, which belong to a group having a shorter quantized round-trip delay time, can more frequently issue allocation request signals in a specific period of time and thus can more frequently send data.

For example, based on the allocation request signals sent in bandwidth R1 from the subsidiary units which belong to the group having the minimum quantized round-trip delay time (Lq), the central unit again allocates bandwidths for the next allocation request signals to the subsidiary units belonging to the relevant group, in a manner such that the bandwidths are located as temporally ahead as possible in bandwidths which have not yet been allocated, and bandwidths for the corresponding data signals are located also as temporally ahead as possible in bandwidths which have not yet been allocated but temporally behind in comparison with the bandwidths for the allocation request signals assigned to the group.

In bandwidths $R_N$, $D_N$, $R_Z$ and the like in the K period in FIG. 1, bandwidth allocation for the subsidiary units which belong to the group having the minimum quantized round-trip delay time is repeatedly performed.

Regarding any subsidiary unit group to which no bandwidth can be allocated in the current period, necessary bandwidths for the allocation request signal and the data signal are allocated in the next period, in a manner such that the bandwidths are located as temporally ahead as possible, similarly to the allocation in the current period. In addition, the allocation of the signal bandwidths between the subsidiary units belonging to the group assigned to the next period, the first conventional method is also applied so as to allocate the bandwidths for the next allocation request signals and the next data signals (e.g., refer to the allocation request signal indicated by reference numeral 401 and the data signal indicated by reference numeral 401 to be sent to the central unit).

That is, in FIG. 1, (i) the subsidiary units, which have sent the allocation request signals received in a specific bandwidth (for the allocation request signal) which is located at the head of each basic period (refer to the basic allocation request signal bandwidth R0), are grouped into a plurality of groups, (ii) bandwidths for the next allocation request signals and the next data signals are allocated to each group, and (iii) data for each group are collectively sent to the group by a transmission permission signal (see signals P1 to P3). In each transmission permission signal, the transmission start time for each signal to be sent from each subsidiary unit and the amount of the data signal (i.e., permitted amount of data), that is, data necessary for each subsidiary unit, are stored.

According to the grouping operation, the allocation request signal bandwidths can be arranged at regular intervals (refer to FIG. 1) and all subsidiary unit groups can send the allocation request signals with minimum delay, thereby reducing the total delay time.

In addition, the data signal bandwidths are not located in the basic allocation request signal bandwidth (R0) at the head of each basic period and in the bandwidths which have already been allocated as the allocation request signal bandwidths (refer to R1, $R_N$, and the like); however, the data signal bandwidths are located in the other bandwidths with priority.

Regarding the subsidiary units to which no bandwidth for the allocation request signal can be allocated in the current basic period, the bandwidths for the data signals are also not allocated in the current period but are allocated in the next period.

When the calculated bandwidths for the allocation request signals are included in the current period, if the central unit receives allocation request signals from subsidiary units (in the same group) in the relevant bandwidths and no bandwidth for the next allocation request signals can be allocated in the current period, the bandwidths for the next allocation request signals are located in the basic allocation request signal bandwidth at the head of the next period.

When increasing the division number N, it is possible to shorten the time from generation of data (in each subsidiary unit), which should be sent to the central unit, to the actual data transmission (i.e., delay time). However, in this case, the allocation request signal and the transmission permission signal are more frequently issued, thereby degrading the efficiency for using the data signal bandwidth. Therefore, preferably, the division number N is dynamically changed according to the state of the network, so that an optimum division number N is selected.

For example, the throughput in TCP (transmission control protocol) is defined by "window size/the round-trip propagation delay time of the data signal". That is, the throughput in TCP is determined by the bandwidth which can be used as the data signal bandwidth in the transmission bandwidth directed to the central unit and by the delay time. Therefore, the delay time for the data signal is monitored and the division number N is changed to an optimum value at any time, so that the best performance can be obtained in any state of the network.

An example will be explained below. The network of this example has a basic period of 0.2 msec, and many low-delay subsidiary units having a round-trip propagation delay time of 0.025 msec and very small number of high-delay subsidiary units having a round-trip propagation delay time of 0.2 msec are connected to the network.

When the many low-delay subsidiary units respectively request bandwidths for small amounts of data transmission and the high-delay subsidiary units request no bandwidth, the division number N is set to 8, so that the allocation request bandwidths are allocated at the intervals of 0.025 msec. Accordingly, many low-delay subsidiary units can send data very frequently, thereby improving the total performance of the network.

On the other hand, when the low-delay subsidiary units request no bandwidth and the high-delay subsidiary units request a large bandwidth, the division number is set to 1, so that the bandwidth allocation is performed at the intervals of 0.2 msec which corresponds to the basic period. Therefore, the high-delay subsidiary units can efficiently send stored data and the total performance can also be improved in this case.

What is claimed is:

1. A bandwidth allocation method used in a point-to-multipoint communication system in which a plurality of subsidiary units are connected via a transmission path to a single central unit and a transmission bandwidth for sending data from the subsidiary units to the central unit is allocated by the central unit to the subsidiary units based on allocation requests from the subsidiary units, where bandwidths for a data signal and an allocation request signal are allocated to each subsidiary unit, the method performed by the central unit comprising the steps of:

quantizing round-trip propagation delay times L between the central unit and the respective subsidiary units by using a division number N, N being an integer of 2 or greater, so as to group the subsidiary units, and assigning a quantized round-trip delay time Lq, which functions as the round-trip propagation delay time, to the subsidiary units which belong to the same group;

allocating bandwidths for allocation request signals to the subsidiary units every time the central unit receives allocation requests from said subsidiary units within a predetermined period of time, wherein based on the quantized round-trip delay time Lq, the bandwidths for the allocation request signals allocated to the subsidiary units which belong to the same group are located as close as possible in a manner such that the bandwidths do not temporally overlap with each other and as temporally ahead as possible in bandwidths which have not yet been allocated; and allocating bandwidths for data signals to the subsidiary units which belong to the same group, based on the quantized round-trip delay time Lq and requested amounts of data which are included in the allocation requests from the subsidiary units, in a manner such that the bandwidths for the data signals are located in bandwidths which have not yet been allocated, as temporally ahead as possible but temporally behind in comparison with the bandwidths for the allocation request signals allocated to the group.

2. A bandwidth allocation method as claimed in claim 1, wherein:

the subsidiary units are grouped into s+2 groups, s being an integer which satisfies $0 \leq s \leq N-2$, under conditions that:

$$0 < L \leq a_0 d, \ a_0 d < L \leq a_1 d, \ a_1 d < L \leq a_2 d, \ldots, a_s d < L \leq L\max$$

where:

grouping coefficient $a_i$, i being an integer of 0 or greater, is an integer of 1 or greater, which satisfies $a_i \leq a_{i+1}$;

Lmax is the maximum round-trip propagation delay time; and $d = L\max/N$; and the quantized round-trip delay time Lq(j) for the subsidiary units which belong to the j-th group is set to a value selected from the range from aid to Lmax, where j=0, 1, . . . , s+1.

3. A bandwidth allocation method as claimed in claim 2, wherein the grouping coefficient $a_i$ satisfies $a_i = 2^i$.

4. A bandwidth allocation method as claimed in claim 1, wherein the division number N is a power of 2.

5. A bandwidth allocation method as claimed in claim 1, wherein the central unit determines the division number N according to the round-trip propagation delay time L of each subsidiary unit which issues the allocation request.

6. A bandwidth allocation method as claimed in claim 1, wherein the grouping is performed and the quantized round-trip delay time Lq is updated every time the division number N is changed.

7. A bandwidth allocation method as claimed in claim 1, further comprising the steps of:

allocating bandwidths for next allocation request signals to the subsidiary units every time the subsidiary units, which belong to the same group and have been allocated with the bandwidths for the allocation request signals, issue allocation requests again, wherein based on the quantized round-trip delay time Lq, the bandwidths for the next allocation request signals are located as close as possible in a manner such that the bandwidths do not temporally overlap with each other and as temporally ahead as possible in bandwidths which have not yet been allocated; and allocating bandwidths for next data signals to said subsidiary units which issue the allocation requests again, based on the quantized round-trip delay time Lq and requested amounts of data which are included in the current allocation requests, in a manner such that the bandwidths for the next data signals are located in bandwidths which have not yet been allocated, as temporally ahead as possible but temporally behind in comparison with the bandwidths for the next allocation request signals allocated to the group.

8. A computer readable medium having computer executable instructions therein for a bandwidth allocation process performed in a point-to-multipoint communication system in which a plurality of subsidiary units are connected via a transmission path to a single central unit and a transmission bandwidth for sending data from the subsidiary units to the central unit is allocated by the central unit to the subsidiary units based on allocation requests from the subsidiary units, where bandwidths for a data signal and an allocation request signal are allocated to each subsidiary unit, the process comprising the steps of:

quantizing round-trip propagation delay times L between the central unit and the respective subsidiary units by using a division number N, N being an integer of 2 or greater, so as to group the subsidiary units, and assigning a quantized round-trip delay time Lq, which functions as the round-trip propagation delay time, to the subsidiary units which belong to the same group;

allocating bandwidths for allocation request signals to the subsidiary units every time the central unit receives allocation requests from said subsidiary units within a predetermined period of time, wherein based on the quantized round-trip delay time Lq, the bandwidths for the allocation request signals allocated to the subsidiary units which belong to the same group are located as close as possible in a manner such that the bandwidths do not temporally overlap with each other and as temporally ahead as possible in bandwidths which have not yet been allocated; and allocating bandwidths for data signals to the subsidiary units which belong to the same group, based on the quantized round-trip delay time Lq and requested amounts of data which are included in the allocation requests from the subsidiary units, in a manner such that the bandwidths for the data signals are located in bandwidths which have not yet been allocated, as temporally ahead as possible but temporally behind in comparison with the bandwidths for the allocation request signals allocated to the group.

* * * * *